United States Patent
Wi et al.

(10) Patent No.: US 11,489,150 B2
(45) Date of Patent: Nov. 1, 2022

(54) LITHIUM ION BATTERY AND CATHODE ACTIVE MATERIAL THEREFOR

(71) Applicant: Samsung Electronics Co., Ltd., Gyeonggi-do (KR)

(72) Inventors: Sungun Wi, Gyeonggi-do (KR); Bookeun Oh, Gyeonggi-do (KR); Jaeyeon Lee, Gyeonggi-do (KR); Jaeman Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 16/444,023

(22) Filed: Jun. 18, 2019

(65) Prior Publication Data

US 2020/0006758 A1  Jan. 2, 2020

(30) Foreign Application Priority Data

Jun. 27, 2018  (KR) .......................... 10-2018-0073936

(51) Int. Cl.
  *H01M 4/36* (2006.01)
  *H01M 10/0525* (2010.01)
  (Continued)

(52) U.S. Cl.
  CPC .......... *H01M 4/364* (2013.01); *H01M 4/131* (2013.01); *H01M 4/366* (2013.01); *H01M 4/525* (2013.01);
  (Continued)

(58) Field of Classification Search
  None
  See application file for complete search history.

(56) References Cited

U.S. PATENT DOCUMENTS

2010/0297490 A1* 11/2010 Takami ............. H01M 10/0587
  429/131
2012/0085975 A1  4/2012 Levasseur et al.
  (Continued)

FOREIGN PATENT DOCUMENTS

EP          2437336 A2    4/2012
JP      2013-246936 A    12/2013
  (Continued)

OTHER PUBLICATIONS

"A Basic Guide to Particle Characterization"; Malvern Instruments Worldwide—White Paper; May 2, 2-12; pp. 1-26 XP055089322; URL:http://golik.co.il/Data/ABasicGuidetoParticleCharacterization(2)_1962085150.pdf.
  (Continued)

*Primary Examiner* — Haixia Zhang
(74) *Attorney, Agent, or Firm* — Cha & Reiter, LLC

(57) ABSTRACT

Certain embodiments of the disclosure relate to a bimodal-type cathode active material for a lithium ion battery. The cathode active material includes a mixture of layered $LiCoO_2$ large particles and manganese-based olivine structural small particles. The manganese-based olivine structural small particles may be represented by chemical formula $LiCo_xMn_yFe_zPO_4$ ($0 \leq x \leq 1$, $0 < y \leq 1$, $0 \leq z \leq 1$, $x+y+z=1$). An average particle diameter of the large particles may be 16 to 25 μm, and an average particle diameter of the small particles may be 1 to 3 μm. The cathode active material of the disclosure can achieve high energy density and high voltage stability.

9 Claims, 7 Drawing Sheets

(51) Int. Cl.
    *H01M 4/525*     (2010.01)
    *H01M 4/62*     (2006.01)
    *H01M 4/131*     (2010.01)
    *H01M 4/58*     (2010.01)
    *H01M 4/02*     (2006.01)

(52) U.S. Cl.
    CPC ......... *H01M 4/5825* (2013.01); *H01M 4/625* (2013.01); *H01M 10/0525* (2013.01); *H01M 2004/028* (2013.01)

(56) References Cited

U.S. PATENT DOCUMENTS

| | | |
|---|---|---|
| 2012/0156560 A1 | 6/2012 | Hong et al. |
| 2014/0038052 A1 | 2/2014 | Song et al. |
| 2014/0356720 A1 | 12/2014 | Nuspl et al. |
| 2015/0104704 A1 | 4/2015 | Kim et al. |
| 2015/0349330 A1 | 12/2015 | Chong |
| 2017/0110731 A1 | 4/2017 | Sun et al. |

FOREIGN PATENT DOCUMENTS

| | | |
|---|---|---|
| JP | 6184588 B2 | 8/2017 |
| KR | 10-2014-0018137 A | 2/2014 |
| KR | 10-1718057 B1 | 3/2017 |

OTHER PUBLICATIONS

Horiba Scientific; "A Guidebook to Particle Size Analysis"; Oct. 5, 2017; pp. 1-34; XP055476651; URL:http://www.horiba.com.fileadmin/uploads/Scientific/eMag/PSA/Guidebook/pdf/PDS_Guidebook.pdf.
European Search Report dated May 27, 2021.
Xu, et al.; "Solvothermal synthesis of nanosheet-like lithium manganese phosphate cathode material with the improved electrochemical performance"; Materials Research Express, 2015.
International Search Report dated Sep. 23, 2019.

\* cited by examiner

LITHIUM ION BATTERY AND CATHODE ACTIVE MATERIAL THEREFOR

CROSS-REFERENCE TO RELATED APPLICATION(S)

This application is based on and claims priority under 35 U.S.C. 119 to Korean Patent Application No. 10-2018-0073936, filed on Jun. 27, 2018, in the Korean Intellectual Property Office, the disclosures of which are herein incorporated by reference in their entireties.

BACKGROUND

1. Technical Field

The disclosure generally relates to a lithium ion battery and a cathode active material therefor. Particularly, the disclosure relates to a bimodal-type cathode active material having high energy density and high voltage stability by using a mixture of layered $LiCoO_2$ large particles and manganese-based olivine structural $LiCo_xMn_yFe_zPO_4$ small particles.

2. Description of Related Art

Lithium cobalt oxide ($LiCoO_2$), which has a layered structure, is widely used as a cathode material for lithium ion batteries which in turn are used for small (e.g. handheld or mobile) electronic devices. $LiCoO_2$ has numerous advantages such as high electrical conductivity, fast diffusion rate of lithium ions, and high energy per volume because it allows the synthesis of relatively large (the size of several tens of micrometers) single-crystal particles.

The theoretical capacity of $LiCoO_2$ is about 274 mAh/g, but the actual battery capacity is about 145 mAh/g, or approximately half. When the upper limit voltage is raised to increase the capacity, phase transition occurs and lifetime characteristic deteriorates. Therefore, while working with $LiCoO_2$, it is difficult to manufacture a battery with high capacity and high voltage stability at the same time. In addition, cobalt (Co) is eluted during high voltage charging, or a cobalt dioxide ($CoO_2$) layer is locally formed on the electrode surface, which is also recognized as a cause of degrading the lifetime.

Recently, demand for higher capacity and higher energy density lithium ion batteries for small mobile devices have increased. In order to meet this demand, methods of constructing the cathode to have high mass density by mixing cathode materials having different particle sizes have been studied. One of them is to introduce a bimodal or trimodal structure. Particularly, in this technique, to increase energy density, $LiCoO_2$ small particles and $LiCoO_2$ large particles having a size of several tens of micrometers are mixed to fill the $LiCoO_2$ small particles between the $LiCoO_2$ large particles. However, because the $LiCoO_2$ small particles have a relative large surface area, their stability may be a problem due to increased surface reactivity.

In addition, replacing various metal or coating with a metal oxide has been used so as to suppress irreversible phase transition, Co elution, release of oxygen, etc. at high voltage or temperature. However, problems may arise in battery lifetime and stability during a high voltage charging state.

Therefore, it is necessary to develop a cathode active material which has higher energy density, is safe even in high voltage or overcharged states, and leads to better battery lifetime.

As described above, a layered lithium cobalt oxide or a bimodal-type mixture thereof has been typically used as a cathode material of a lithium ion battery for small electronic devices. However, the typical cathode active material fails to achieve high energy density and high voltage stability at the same time.

SUMMARY

Additional aspects will be set forth in part in the description which follows and, in part, will be apparent from the description, or may be learned by practice of the presented embodiments.

According to an embodiment of the disclosure, provided is a bimodal-type cathode active material for a lithium ion battery. The cathode active material may include a mixture of layered $LiCoO_2$ large particles and manganese-based olivine structural small particles. The manganese-based olivine structural small particles may be represented by chemical formula $LiCo_xMn_yFe_zPO_4$ ($0 \le x \le 1$, $0 < y \le 1$, $0 \le z \le 1$, $x+y+z=1$). An average particle diameter of the large particles may be about 16 to 25 μm, and an average particle diameter of the small particles may be about 1 to 3 μm.

According to an embodiment of the disclosure, in the chemical formula $LiCo_xMn_yFe_zPO_4$ of the manganese-based olivine structural small particles, $0.1 \le x \le 0.4$, $0.2 \le y \le 0.8$, and $0.1 \le z \le 0.6$.

According to an embodiment of the disclosure, in the chemical formula $LiCo_xMn_yFe_zPO_4$ of the manganese-based olivine structural small particles, $0.7 \le y \le 0.8$.

According to an embodiment of the disclosure, the manganese-based olivine structural small particles may be secondary particles made from aggregation of primary particles having an average thickness of about 100 nm or less, and the secondary particles have a spherical or plate-like mesocrystal aggregate structure.

According to an embodiment of the disclosure, the secondary particles may be formed using a solvothermal synthesis technique.

According to an embodiment of the disclosure, the surfaces of the secondary particles are coated with a carbon-based material.

According to an embodiment of the disclosure, a mixing ratio of the large particles to the small particles may be 80:20 to 99:1 by weight.

According to an embodiment of the disclosure, the cathode active material may have an operating voltage ranging from about 3.0 V to 4.5 V.

According to an embodiment of the disclosure, the cathode active material may have a rolling density of about 3.8 to 4.4 g/cc.

According to an embodiment of the disclosure, a method for producing the manganese-based olivine structural small particles may comprise:

a) preparing a precursor aqueous solution by mixing $Co(CH_3COO)_2 \cdot 4H_2O$, $Mn(CH_3COO)_2 \cdot 4H_2O$, and $Fe(NO_3)_3 \cdot 9H_2O$ in accordance with a molar ratio;

b) forming a solid solution of Co, Mn, and Fe by mixing and stirring the precursor aqueous solution with N,N-dimethylformamide (DMF);

c) forming $LiCo_xMn_yFe_zPO_4$ primary particles by introducing $H_3PO_4$, lithium hydroxide monohydrate ($LiOH \cdot H_2O$), and ascorbic acid ($C_6H_8O_6$) into the solid solution; and d) forming $LiCo_xMn_yFe_zPO_4$ secondary particle aggregation by injecting nitric acid ($HNO_3$) into the $LiCo_xM$-

$n_yFe_zPO_4$ primary particles, adjusting pH, and using a solvothermal synthesis technique.

According to an embodiment of the disclosure, the method may further comprise:

e) coating the secondary particle aggregation with a conductive material.

According to an embodiment of the disclosure, $LiCo_xMn_yFe_zPO_4$ primary particles may have an average thickness of about 100 nm or less.

According to an embodiment of the disclosure, the $LiCo_xMn_yFe_zPO_4$ secondary particle aggregation may have a spherical structure.

According to an embodiment of the disclosure, the $LiCo_xMn_yFe_zPO_4$ secondary particle aggregation may have a plate-like structure.

According to an embodiment of the disclosure, the conductive material may be a material capable of forming a carbon coating after heat treatment and be glucose, sucrose, polyethylene glycol, polyvinyl alcohol, polyvinyl chloride, citric acid, or ascorbic acid.

According to an embodiment of the disclosure, a cathode for lithium ion batteries comprising the cathode active material may be provided.

According to an embodiment of the disclosure, lithium ion batteries comprising the cathode active material may be provided.

According to an embodiment of the disclosure, electronic devices comprising the lithium ion batteries as the battery module may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
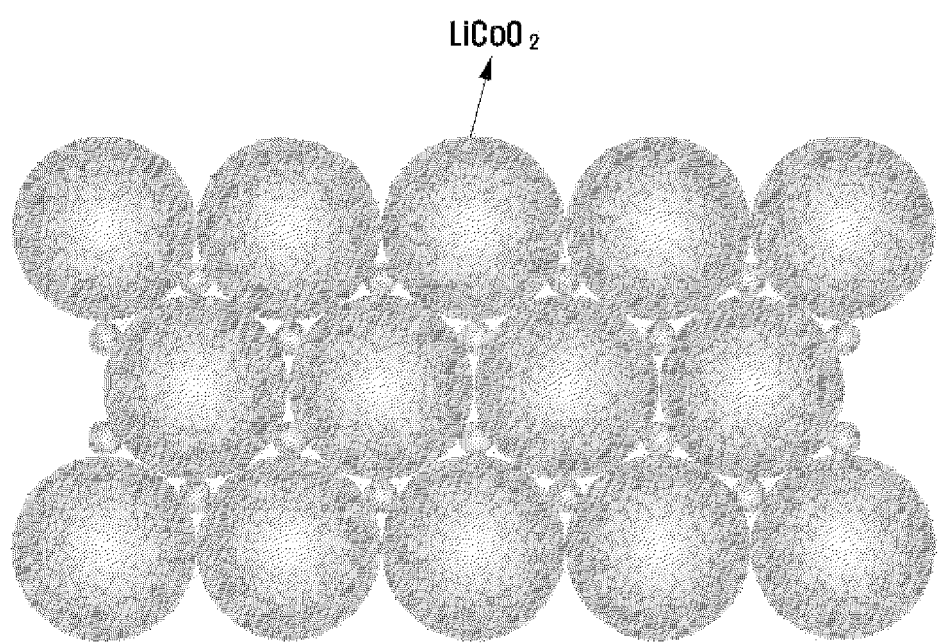
FIG. 1 is a schematic diagram of a conventional electrode structure using layered $LiCoO_2$ having different average particle diameters as a cathode active material.

Certain embodiments of the disclosure relate to a cathode active material and lithium ion batteries including the cathode active material. The cathode active material has high energy density and high voltage stability due to its use of layered $LiCoO_2$ as large particles and its use of, as small particles, manganese-based olivine structural compound which is represented by the chemical formula of $LiCo_xMn_yFe_zPO_4$ ($0 \leq x \leq 1$, $0 < y \leq 1$, $0 \leq z \leq 1$, $x+y+z=1$).

According to certain embodiments of the disclosure, a cathode active material is realized as having high energy per volume, excellent lifetime, and high voltage stability. This is accomplished by mixing, in a bimodal form, layered $LiCoO_2$ large particles, which are surface-treated to be stable even in a high voltage state to realize higher energy density, and manganese-based olivine structural $LiCo_xMn_yFe_zPO_4$ small particles having excellent structure stability, excellent surface stability, and high operating voltage.

Generally, layered $LiCoO_2$, which may be conventionally used as the cathode material of lithium ion batteries, is capable of being synthesized to have large particles (i.e. several tens of micrometers). Accordingly, layered $LiCoO_2$ may have high mass density. However, as explained above, the actual cell capacity is typically drastically lower than the high theoretical capacity. If the upper limit voltage is raised to obtain higher capacity, irreversible phase transition occurs and the structure becomes unstable. It is therefore difficult to ensure high capacity at high voltage.

In order to further increase the mass density, layered $LiCoO_2$ large particles may be used in a bimodal form together with $LiCoO_2$ small particles, small being a size of several hundred nanometers. However, the use of $LiCoO_2$ small particles causes increases in surface area and surface reactivity. Thus, it may further increase instability at high voltage.

Certain embodiments of the disclosure proposes methods which are designed to compensate for the disadvantages of $LiCoO_2$ large/small particles which have been typically used as cathode material, and to achieve high energy density and high voltage stability for the cathode active material in lithium ion batteries used in mobile electronic devices. In doing so, manganese-based olivine structural $LiCo_xMn_yFe_zPO_4$ small particles are used.

A cathode active material according to an embodiment of the disclosure may include layered $LiCoO_2$ large particles having excellent mass density and may be surface-treated to be stable even in high voltage conditions. The $LiCoO_2$ large particles may be surface-coated with aluminum oxide ($Al_2O_3$) to improve surface stability. In this case, the $Al_2O_3$ may be coated over the entire surface of the $LiCoO_2$ large particles at a coating thickness from about 0.5 nm to about 2 nm. In addition, the $Al_2O_3$ may be coated by dry or wet process, and any other known process may be used. The term "about" in the specification can refer to a variation of ±10% of the value specified. For example, "about 0.5 nm" can in some embodiments carry a variation from 0.45 to 0.55 nm. This also may apply to other instances of "about" or "approximately" below.

The layered $LiCoO_2$ large particles contained in the cathode active material according to one or more embodiments of the disclosure may be doped with a dissimilar metal element to ensure surface and structure stabilities. When such a metal element is doped, the large particle compound may be represented by the following formula:

$LiCo_{1-x}M_xO_2$ ($0 < x \leq 0.1$).

In the above formula, the dissimilar metal element M may be at least one of Mg, K, Na, Ca, Si, Ti, Zr, Sn, Y, Sr, Mo, and Mn.

The average particle diameter of the LiCoO$_2$ large particles contained in the cathode active material according to one or more embodiments of the disclosure may be preferably about 16 to 25 μm in order to ensure high mass density and surface stability. If the average particle diameter of the LiCoO$_2$ large particles is smaller than about 16 μm, mass density may become low, and high voltage stability may be lowered due to an increase in surface reactivity caused by increased surface area. In addition, Co elution may occur, and a CoO$_2$ layer may be formed, thus causing battery lifetime to be degraded. If the average particle diameter of the LiCoO$_2$ large particles is greater than about 25 μm, it may be difficult to realize high capacity/power output capability as the travel distance of Li ions becomes longer. The diffusion distance of Li ions may be calculated by the equation L=(D·t)$^{1/2}$, where L is the diffusion length, D is the diffusion coefficient, and t is time. That is, when the LiCoO$_2$ particle size is increased, the time required for the diffusion of Li ions is increased, and this may deteriorate high capacity/power output capability. Thus, when the average particle diameter of the LiCoO$_2$ large particles is greater than about 25 μm, the characteristic degradation due to particle size may be significant.

In addition, the cathode active material according to one or more embodiments of the disclosure may include manganese-based olivine structural small particles which are structurally stable and have high operating voltage. The manganese-based olivine structural small particles may be small particles represented by the chemical formula of LiCo$_x$Mn$_y$Fe$_z$PO$_4$ (0≤x≤1, 0<y≤1, 0≤z≤1, x+y+z=1).

The cathode material that includes manganese-based olivine structure is very stable due to the nature of olivine structure, and surface stability may not be lowered even when used as the small-sized particle in the cathode active material. It may also have a high operating voltage of up to about 4.1 V (or up to about 4.3 V, or even about 4.5 V depending on elemental composition ratio). Considering that the operating voltage of LiCoO$_2$, which is the most widely used cathode material for lithium ion batteries of small electronic devices, is about 3.7 V, and the operating voltage of LFP series (LiFePO$_4$), which has olivine structure but is not manganese-based, is about 3.2 V, the operating voltage according to one or more embodiments of the disclosure is relatively high.

However, manganese-based olivine structure has been not conventionally used in cathode materials that require high energy density because the lithium ion travel path is one-dimensional and thus the energy amount per volume is small. In addition, because cathode material that includes manganese-based olivine structure is electrically nonconductive, it may be necessary to coat primary particles of about 100 nm or less with materials such as carbon, which has high electrical conductivity. Further, nano-sized particles are difficult to handle and coupled with the need to increase the content of carbon conductor and binder at the time of production, it may be difficult to commercialize and manufacture.

In order to overcome the above problems in applying manganese-based olivine structure to the cathode material of lithium ion batteries for small electronic devices, one or more embodiments of the disclosure propose using secondary particles, in which manganese-based olivine structural LiCo$_x$Mn$_y$Fe$_z$PO$_4$ primary particles are aggregated, as small particles of the cathode active material in a bimodal form.

The cathode active material according to one or more embodiments of the disclosure may contain manganese-based olivine structural small particles represented by the chemical formula of LiCo$_x$Mn$_y$Fe$_z$PO$_4$ (0≤x≤1, 0<y≤1, 0≤z≤1, x+y+z=1).

Preferably, the cathode active material according to one or more embodiments of the disclosure may contain manganese-based olivine structural small particles represented by the chemical formula of LiCo$_x$Mn$_y$Fe$_z$PO$_4$ (0.1≤x≤0.4, 0.2≤y≤0.8, 0.1≤z≤0.6, x+y+z=1).

In olivine structural LiM'PO$_4$ (M' is Fe, Mn, and Co), Co and Mn have high energy densities due to high operating voltages, but have poor power output capability due to low electric conductivity and Li migration. In contrast, in case of Fe, although exhibiting excellent power output capability due to relatively high electric conductivity and Li migration, it has low energy density due to low operating voltage. Therefore, when x is smaller than 0.1 in the formula of the manganese-based olivine structural small particles, the power output capability may be good, but the energy density at a low rate (C-rate) may be lowered. In addition, when x is greater than 0.4, the energy density at the low rate may be increased, but the power output capability at a high rate may be lowered.

When y is smaller than 0.2 in the formula of the manganese-based olivine structural small particles, the power output capability may be good, but the energy density at the low rate may be lowered. In addition, when y is greater than 0.8, the energy density at the low rate may be increased, but the power output capability at the high rate may be lowered.

When z is smaller than 0.1 in the formula of the manganese-based olivine structural small particles, the energy density at the low rate may be increased, but the power output capability at the high rate may be lowered. In addition, when z is greater than 0.6, the power output capability may be good, but the energy density at the low rate may be lowered.

Also, in the formula of the manganese-based olivine structural small particles, x, y, and z may be adjusted depending on criteria in the design of the battery cell. For example, when improving the power output capability rather than the energy density is desired, the Fe content may be relatively increased as compared with Co and Mn. In contrast, when improving the energy density rather than the power output capability is desired, the Fe content may be lowered and the Co and Mn contents may be increased.

According to certain embodiments of the disclosure, concentrating on improving the power output capability of the lithium ion battery, the range of x, y, and z in the formula LiCo$_x$Mn$_y$Fe$_z$PO$_4$ of the manganese-based olivine structural small particles contained in the cathode active material may be 0<x≤0.2, 0<y≤0.2, and x+y+z=1. For example, the composition of the manganese-based olivine structural small particles may be selected as LiCo$_{0.2}$Mn$_{0.2}$Fe$_{0.6}$PO$_4$.

According to various embodiments of the disclosure, in case of concentrating on the improvement in the energy density of a lithium ion battery, the range of x, y, and z in the formula LiCo$_x$Mn$_y$Fe$_z$PO$_4$ of the manganese-based olivine structural small particles contained in the cathode active material may be 0.2≤x≤0.6, 0.4≤y≤0.8, 0<z≤0.2, and x+y+z=1. For example, the composition of the manganese-based olivine structural small particles may be LiCo$_{0.4}$Mn$_{0.4}$Fe$_{0.2}$PO$_4$.

Furthermore, in one preferred embodiment of the disclosure, in order to generate a lithium ion battery with both high energy density and excellent power output capability, the range of x, y, and z in the formula LiCo$_x$Mn$_y$Fe$_z$PO$_4$ of the manganese-based olivine structural small particles contained in the cathode active material may be 0.1≤x≤0.2, $0.7 \leq y \leq 0.8$, $0.1 \leq z \leq 0.2$, and $x+y+z=1$. For example, the composition of the manganese-based olivine structural small particles may be $LiCo_{0.1}Mn_{0.8}Fe_{0.1}PO_4$.

The cathode active material according to one or more embodiments of the disclosure may contain, as small particles, secondary particles having an average particle diameter of about 1 to 3 μm in which manganese-based olivine structural $LiCo_xMn_yFe_zPO_4$ primary particles having an average thickness of about 100 nm or less are aggregated.

Specifically, the manganese-based olivine structural $LiCo_xMn_yFe_zPO_4$ small particles may be secondary particles in which flake-type primary particles having an average thickness of about 100 nm or less are aggregated, and may have a spherical or plate-like mesocrystal aggregate structure.

When the average particle diameter of the $LiCo_xMn_yFe_zPO_4$ small particles (secondary particles) is smaller than about 1 μm, the small-sized particles make handling difficult and lower process efficiency. In addition, because increasing the content of conductive carbon is required for constructing an electrode, the energy density may be lowered. When the average particle diameter of the $LiCo_xMn_yFe_zPO_4$ small particles is greater than about 3 μm, the particles are too large to be effectively placed as small particles in the spaces between the large particles, resulting in lower mass density. Also, as the secondary particle size of the small particles increases, power output capability may be lowered.

The cathode active material according to one or more embodiments of the disclosure may contain layered $LiCoO_2$ large particles and manganese-based olivine structural $LiCo_xMn_yFe_zPO_4$ small particles, which together are mixed in a weight ratio of 50:50 to 99:1. Preferably, they may be mixed in a weight ratio ranging from about 80:20 to about 90:10. The final packing density of the cathode active material may be increased according to the weight ratio. When the $LiCoO_2$ large particles are spherical, the maximum packing factor is theoretically about 74%. Therefore, when the manganese-based olivine structural $LiCo_xMn_yFe_zPO_4$ small particles exceed about 20% of the total weight of the $LiCoO_2$ large particles and the $LiCo_xMn_yFe_zPO_4$ small particles, the volume of the small particle is larger than the spaces between the large particles. This may lower the rolling density of the electrode, and thus reducing energy density.

The cathode active material according to one or more embodiments of the disclosure may have an operating voltage range of about 3.0 to 4.5 V when the layered $LiCoO_2$ large particles and the manganese-based olivine structural $LiCo_xMn_yFe_zPO_4$ small particles are packed together.

When the layered $LiCoO_2$ large particles and the manganese-based olivine structural $LiCo_xMn_yFe_zPO_4$ small particles, which have different average particle diameters, are mixed together to be used as the cathode active material of one or more embodiments of the disclosure, the capacity per volume may be increased due to an increased rolling density as compared to the conventional process of using mixed cathode active materials having similar average particle diameters. Further, as compared with other cases of using layered $LiCoO_2$ large/small particles having different average particle diameters as the cathode active material, the cathode active material of one or more embodiments of the disclosure may be stable even at a high voltage due to it having a high operating voltage. Further, the cathode active material of one or more embodiments of the disclosure may have an increased capacity per volume because of its increased rolling density, and have improved stability in an overcharged state.

The cathode active material according to one or more embodiments of the disclosure may have a rolling density of about 3.8 to 4.4 g/cc when the layered $LiCoO_2$ large particles and the manganese-based olivine structural $LiCo_xMn_yFe_zPO_4$ small particles are packed together.

When the layered $LiCoO_2$ large particles and the manganese-based olivine structural $LiCo_xMn_yFe_zPO_4$ small particles, which have different average particle diameters, are mixed together to be used as the cathode active material of one or more embodiments of the disclosure, the rolling density is significantly increased as compared to the conventional process of using mixed cathode active materials having similar average particle diameters or using layered $LiCoO_2$ large/small particles having different average particle diameters as the cathode active materials.

The cathode active material according to one or more embodiments of the disclosure may be produced through various processes known in the art.

For example, the secondary particles of the manganese-based olivine structural compound contained in the cathode active material of one or more embodiments of the disclosure may be formed into spherical or plate-like shape by using a solvothermal synthesis technique.

In addition, the manganese-based olivine structural $LiCo_xMn_yFe_zPO_4$ small particles contained in the cathode active material of one or more embodiments of the disclosure may be formed by coating a conductive material on surfaces of the spherical or plate-like secondary particles.

The conductive material is used for providing a conductive path to the cathode active material of one or more embodiments of the disclosure so as to improve electrical conductivity, and any of those generally used for lithium ion batteries may be used. For example, the conductive material may be carbon-based, a conductive polymer, or a mixture thereof. The conductive material coated on the secondary particles of the manganese-based olivine structural compound is preferably carbon-based. The carbon-based material is a material capable of forming a carbon coating after heat treatment and may be at least one of glucose, sucrose, polyethylene glycol, polyvinyl alcohol, polyvinyl chloride, citric acid, and ascorbic acid. The content of the conductive material may be adjusted as desired. For example, the weight ratio of the secondary particles of the manganese-based olivine structural compound to the conductive material may be in the range of about 70:30 to about 90:10.

A conventional mixing method may be used for mixing the manganese-based olivine structural $LiCo_xMn_yFe_zPO_4$ small particles, obtained as described above, with $LiCoO_2$ large particles. For example, mixing methods using mortar, mill, or mixer may be possible.

A solvent may be added to facilitate the mixing of the large particles with the small particles. The solvent may be water, alcohol, or a mixture thereof. The alcohol may have one to four carbon atoms, such as methanol, ethanol, isopropanol, or a mixture thereof.

Certain embodiments of the disclosure may provide a method for producing the manganese-based olivine structural small particles.

The method for producing the manganese-based olivine structural small particles may comprise:

a) preparing a precursor aqueous solution by mixing $Co(CH_3COO)_2 \cdot 4H_2O$, $Mn(CH_3COO)_2 \cdot 4H_2O$, and $Fe(NO_3)_3 \cdot 9H_2O$ in accordance with a molar ratio;

b) forming a solid solution of Co, Mn, and Fe by mixing and stirring the precursor aqueous solution with N,N-dimethylformamide (DMF);

c) forming $LiCo_xMn_yFe_zPO_4$ primary particles by introducing $H_3PO_4$, lithium hydroxide monohydrate ($LiOH.H_2O$), and ascorbic acid ($C_6H_8O_6$) into the solid solution; and d) forming $LiCo_xMn_yFe_zPO_4$ secondary particle aggregation by injecting nitric acid ($HNO_3$) into the $LiCo_xMn_yFe_zPO_4$ primary particles, adjusting pH, and using a solvothermal synthesis technique.

In addition, the method for producing the manganese-based olivine structural small particles may further comprise:

e) coating the secondary particle aggregation with a conductive material.

According to one embodiment of the disclosure, in the method for producing the manganese-based olivine structural small particles, the $LiCo_xMn_yFe_zPO_4$ primary particles may have an average thickness of about 100 nm or less.

According to one embodiment of the disclosure, in the method for producing the manganese-based olivine structural small particles, the $LiCo_xMn_yFe_zPO_4$ secondary particle aggregation may have spherical or plate-like structure.

According to one embodiment of the disclosure, in the method for producing the manganese-based olivine structural small particles, the conductive material is a material capable of forming a carbon coating after heat treatment and may be glucose, sucrose, polyethylene glycol, polyvinyl alcohol, polyvinyl chloride, citric acid, or ascorbic acid.

Certain embodiments of the disclosure may provide a cathode including the cathode active material.

The cathode according to one or more embodiments of the disclosure may include the cathode active material and may be produced through a method in which a cathode active material composition is prepared by mixing the layered $LiCoO_2$ large particles, the manganese-based olivine structural $LiCo_xMn_yFe_zPO_4$ small particles, a conductive material, and a binder in a solvent, and then the cathode active material composition is molded into a predetermined shape or applied to a current collector such as aluminum foil.

The binder used for the cathode active material composition is a component for assisting in bonding of the cathode active material and the conductive material and bonding to the current collector. The binder may be added in an amount of about 1 to 50 parts by weight with respect to 100 parts by weight of the cathode active material. For example, the binder may be added in a range of about 1 to 30 parts by weight, about 1 to 20 parts by weight, or about 1 to 15 parts by weight with respect to 100 parts by weight of the cathode active material. Examples of the binder include polyvinylidene fluoride, polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethyl methacrylate, polyaniline, acrylonitrile butadiene styrene, phenolic resins, epoxy resins, polyethylene terephthalate, polytetrafluoroethylene, polyphenylene sulfide, polyamideimide, polyetherimide, polyethersulfone, polyamide, polyacetal, polyphenylene oxide, polybutylene terephthalate, ethylene-propylene-diene terpolymer (EPDM), sulfonated EPDM, styrene butadiene rubber, fluorine rubber, or various copolymers.

As the solvent, N-methylpyrrolidone (NMP), acetone, water, or the like may be used. The content of the solvent is about 1 to 10 parts by weight with respect to 100 parts by weight of the cathode active material. When the content of the solvent is within the above range, the formation of the active material layer may be facilitated.

In addition, the current collector is generally made with a thickness of about 3 to 500 µm. The current collector is not particularly limited as long as it has conductivity without causing chemical changes in the battery. For example, the current collector may be made of stainless steel, aluminum, nickel, titanium, sintered carbon, copper, stainless steel surface-treated with carbon, nickel, titanium, silver, etc., an aluminum-cadmium alloy, or the like. Further, fine unevenness may be formed on the surface to enhance bonding to the cathode active material, and the current collector may be in various forms such as film, sheet, foil, net, a porous body, foam, and nonwoven fabric.

A cathode plate may be prepared by directly coating the cathode active material composition on the current collector. Alternatively, the cathode plate may be obtained by casting the cathode active material composition on a separate support, peeling a cathode active material film from the support, and laminating the cathode active material film on a current collector, such as a copper foil current collector.

Certain embodiments of the disclosure may provide a lithium ion battery including a cathode that in turn includes a cathode active material; an anode disposed opposite to the cathode; and an electrolyte disposed between the cathode and the anode.

In order to manufacture the anode, an anode active material composition in which an anode active material, a binder, a solvent, and a conductive material, which are selectively mixed, may be prepared.

The anode active material is not particularly limited and can be one that is conventionally in the art. Non-limiting examples of the anode active material include lithium metal, metal capable of alloying with lithium, transition metal oxide, material capable of doping and dedoping lithium, material capable of reversibly intercalating and deintercalating lithium ions, or the like.

As the conductive material, binder, and solvent in the anode active material composition, the same materials as those for the above-mentioned cathode active material composition may be used. In some cases, a plasticizer may be further added to the cathode active material composition and the anode active material composition to form pores inside electrode plates. The amounts for the anode active material, the conductive material, the binder and the solvent for the anode may be at levels commonly used in the art.

The anode may further include an anode current collector. The anode current collector is not particularly limited as long as it has a thickness of about 3 to 500 µm and has high conductivity without causing chemical changes in the battery. For example, copper, stainless steel, nickel, titanium, sintered carbon, aluminum or stainless steel surface-treated with carbon, nickel, titanium, silver, or the like may be used. The current collector may have fine unevenness formed on the surface thereof to increase bonding to the anode active material, and various forms such as film, sheet, foil, net, a porous body, foam, and nonwoven fabric are possible.

The prepared anode active material composition may be directly coated on the anode current collector and dried to produce an anode plate.

Alternatively, the anode active material composition may be cast on a separate support, and then a film obtained by peeling from the support may be laminated on the anode collector to produce an anode plate.

The cathode and the anode may be separated by a separator, and any separator commonly used in lithium batteries may be used. Particularly, the separator preferably has certain characteristics, such as the resistance against the ion movement of the electrolyte is low, and the ability to impregnate the electrolyte is excellent. For example, the separator may be made of glass fibers, polyester, Teflon, polyethylene, polypropylene, polytetrafluoroethylene (PTFE), and/or combinations thereof, and may be in the form of nonwoven or woven fabric. The separator may have a pore diameter of about 0.01 to 10 μm and a thickness of about 5 to 300 μm.

The electrolyte may be a non-aqueous electrolyte containing a lithium salt and may be composed of a non-aqueous electrolyte and a lithium salt.

The non-aqueous electrolyte may be composed of a non-aqueous electrolytic solution such as an organic solid electrolyte, an inorganic solid electrolyte, or the like.

More specifically, the non-aqueous electrolytic solution may be composed of an aprotic organic solvent, such as N-methyl-2-pyrrolidinone, propylene carbonate, ethylene carbonate, butylene carbonate, dimethyl carbonate, diethyl carbonate, gamma-butyro lactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

The organic solid electrolyte may be composed of, for example, a polyethylene derivative, a polyethylene oxide derivative, a polypropylene oxide derivative, a phosphate ester polymer, an agitation lysine, a polyester sulfide, a polyvinyl alcohol, a polyvinylidene fluoride, polymers containing ionic dissociation groups, or the like.

The inorganic solid electrolyte may include nitride, halide, or sulfate of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium salt may be any of the conventionally used lithium salts in lithium ion batteries, and may be a material easily dissolvable in the non-aqueous electrolyte. For example, the lithium salt may be $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carboxylate, lithium tetraphenylborate, or imide.

Certain embodiments of the disclosure may provide an electronic device comprising the lithium ion battery as a battery module. The electronic device may be various kinds of devices that are electronically powered and may include small electronic devices such as, for example, smart phones, tablet PCs, feature phones, smart watches, portable speakers, and the like.

Hereinafter, examples of the disclosure will be described in detail with reference to the accompanying drawings. However, the disclosure is not limited to the examples described below, and may be embodied in various different forms. The following examples are provided so that this disclosure is thorough and complete and will fully convey the scope of the disclosure to those skilled in the art. Also, for convenience of explanation, the drawings are not to scale.

FIG. 1 is a schematic diagram of a conventional electrode structure when layered $LiCoO_2$ large particles and layered $LiCoO_2$ small particles are mixed with each other and used as a cathode active material. In addition, FIGS. 2 and 3 are schematic diagrams of an electrode structure when cathode active material, as embodiments of the disclosure, are used.

Figure 2:
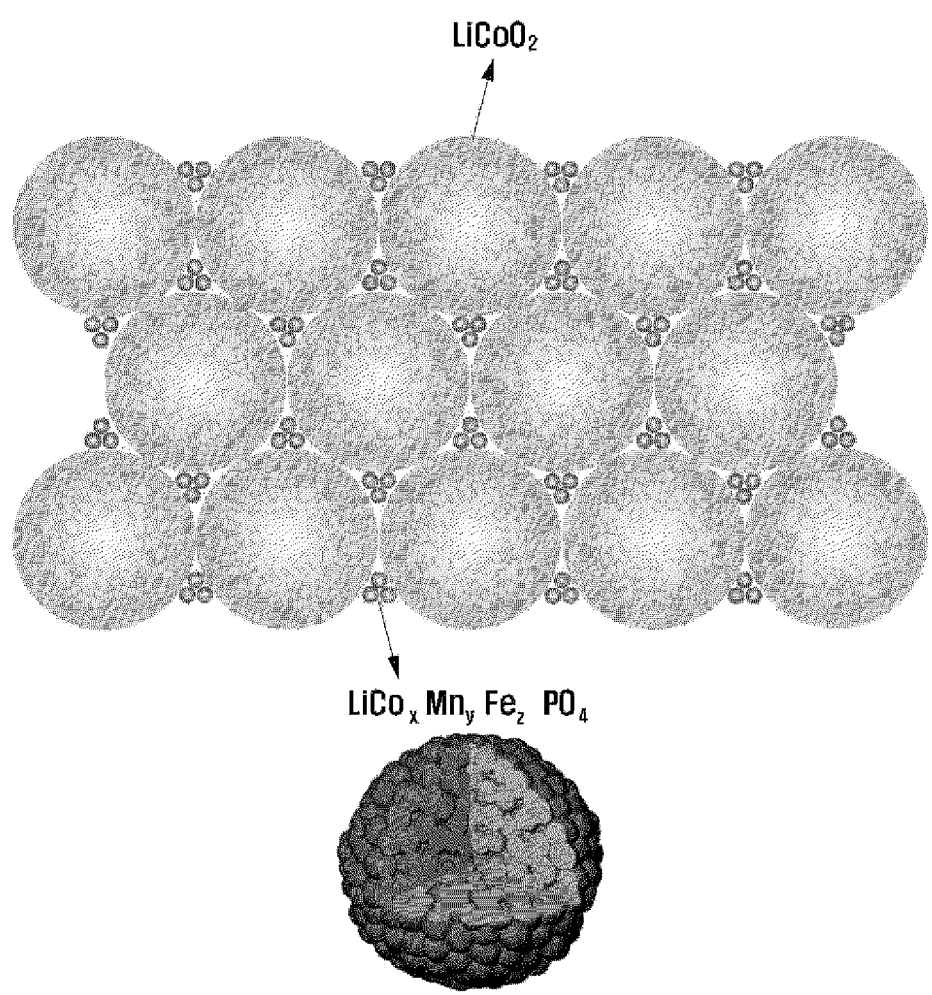
FIG. 2 is a schematic diagram of a bimodal-type electrode structure in which manganese-based olivine structural $LiCo_xMn_yFe_zPO_4$ spherical secondary particles having a small average particle diameter are filled in spaces between layered $LiCoO_2$ particles having a large average particle size.
Figure 3:
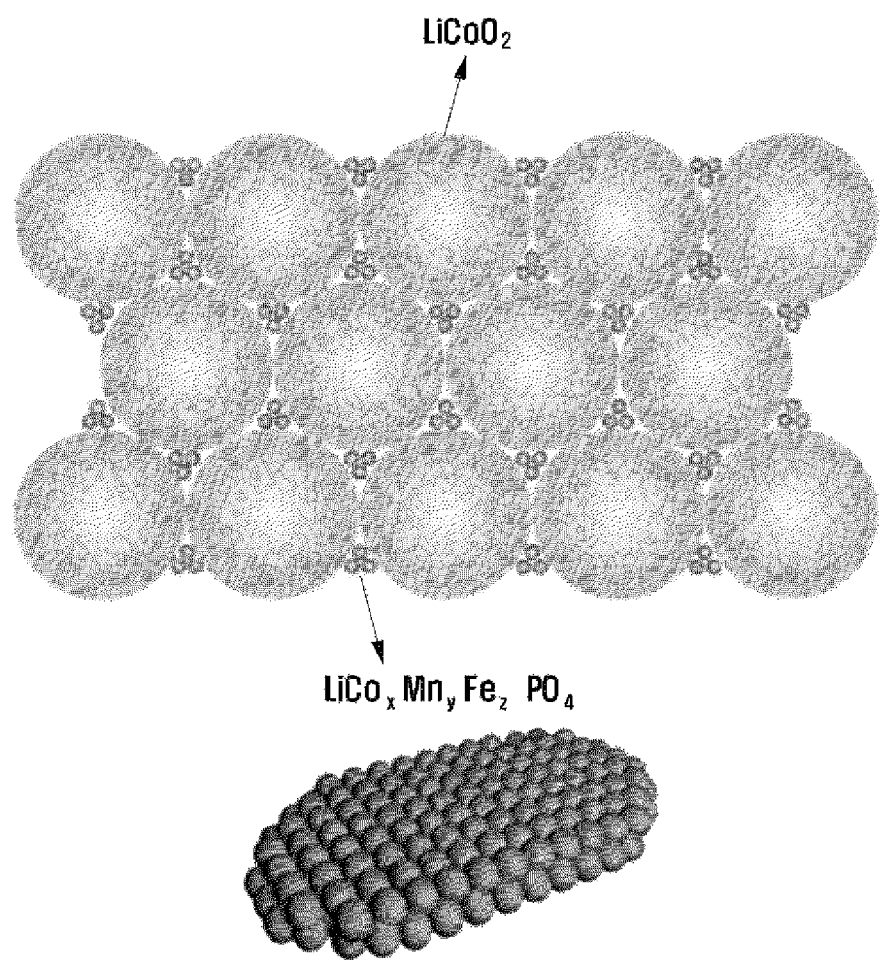
FIG. 3 is a schematic diagram of a bimodal-type electrode structure in which manganese-based olivine structural $LiCo_xMn_yFe_zPO_4$ plate-like secondary particles having a small average particle diameter are filled in spaces between layered $LiCoO_2$ particles having a large average particle size.

Referring to FIGS. 2 and 3, the cathode active material according to one or more embodiments of the disclosure is formed of a bimodal type in which manganese-based olivine structural $LiCo_xMn_yFe_zPO_4$ small particles having small average particle diameter are filled in the interstitial volume between layered $LiCoO_2$ particles having large average particle size.

In the example of FIG. 2, the cathode active material according to one or more embodiments of the disclosure contains the layered $LiCoO_2$ large particles having average particle diameter of about 16 to 25 μm and the manganese-based olivine structural $LiCo_xMn_yFe_zPO_4$ small particles having average particle diameter of about 1 to 3 μm. Also, the manganese-based olivine structural $LiCo_xMn_yFe_zPO_4$ small particles may be secondary particles in which primary particles having average thickness of about 100 nm or less are spherically aggregated.

In the example of FIG. 3, the cathode active material according to one or more embodiments of the disclosure contains the layered $LiCoO_2$ large particles having average particle diameter of about 16 to 25 μm and the manganese-based olivine structural $LiCo_xMn_yFe_zPO_4$ small particles having average particle diameter of about 1 to 3 μm. Also, the manganese-based olivine structural $LiCo_xMn_yFe_zPO_4$ small particles may be secondary particles in which primary particles having average thickness of about 100 nm or less are aggregated in a plate-like shape.

As shown in FIG. 3, when the manganese-based olivine structural $LiCo_xMn_yFe_zPO_4$ small particles are secondary particles that are aggregated in the plate-like shape, a higher rolling density can be realized when the electrode is rolled. Thus, the amount of energy per volume can be further increased. In addition, compared with secondary particles of spherical aggregation, most of the primary particles contained in the manganese-based olivine structural small particles have the structure to directly contact the electrolyte solution and the conductive carbon particles. Therefore, power output capability of the battery can be further improved. For example, when a lithium ion battery is manufactured using the cathode active material as shown in FIG. 3, rapid charging/discharging can be facilitated at a C-rate of about 1C or more. Also, the rapid charging/discharging can be performed relatively safely even at a high voltage.

As disclosed above, the manganese-based olivine structural $LiCo_xMn_yFe_zPO_4$ small particles according to one or more embodiments of the disclosure are not limited to specific Co/Mn/Fe compositions, but may be in ranges of x, y and z values adjusted depending on the desired characteristics of the battery. For example, when improving the power output capability is more important than improving the energy density, the Fe content may be relatively increased as compared with Co and Mn. In contrast, when improving the energy density is more important than the power output capability, the Fe content may be lowered and the Co and Mn contents may be increased.

Figure 4A:
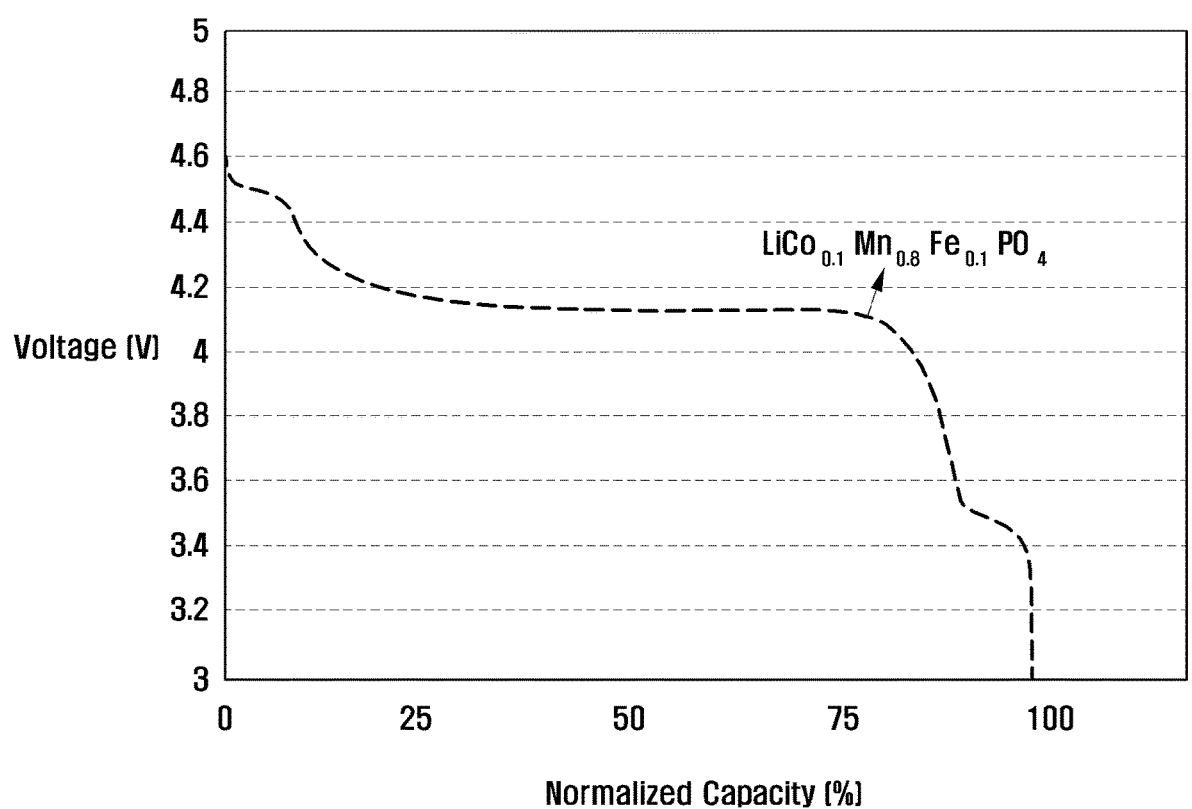
FIG. 4A, FIG. 4B, and FIG. 4C are graphs showing discharge curves of various examples of manganese-based olivine structural small particles used in cathode active material according to several embodiments of the disclosure.
Figure 4B:
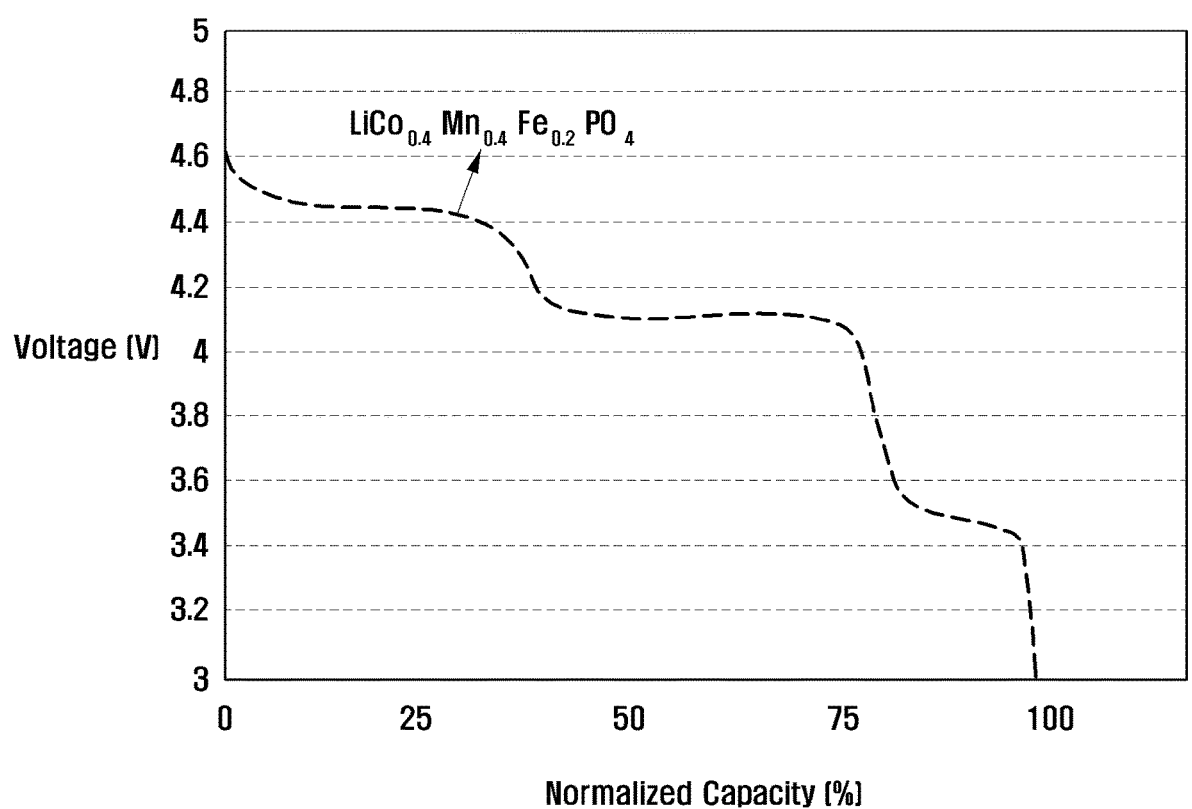
Figure 4C:
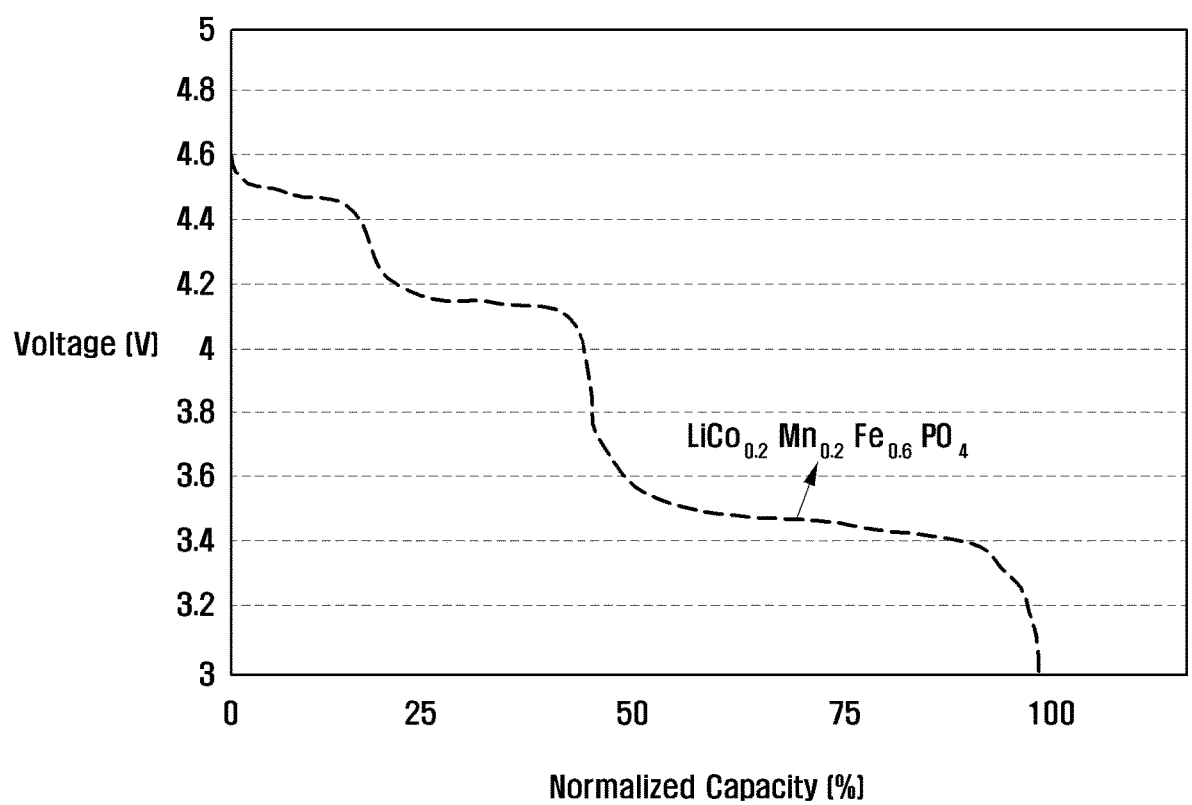

FIG. 4A-4C are graphs illustrating voltage curves of $LiCo_xMn_yFe_zPO_4$ small particles in Examples 1 to 3 of the cathode active material shown in the below table 1. The compositions and mixing ratios of Examples 1 to 3 are shown in Table 1.

TABLE 1

| Cathode active material | Composition of manganese-based olivine structural $LiCo_xMn_yFe_zPO_4$ small particles | | | Mixing ratio of layered large particles and olivine structural small particles (by weight) | |
|---|---|---|---|---|---|
| | x | y | z | $LiCoO_2$ large particles | $LiCo_xMn_yFe_zPO_4$ small particles |
| Example 1 | 0.1 | 0.8 | 0.1 | 80 | 20 |
| Example 2 | 0.4 | 0.4 | 0.2 | 80 | 20 |
| Example 3 | 0.2 | 0.2 | 0.6 | 80 | 20 |

The cathode active materials of Examples 1 to 3 may be produced by the following method.

First, in order to synthesize the manganese-based olivine structural small particles, $LiCo_xMn_yFe_zPO_4$ aggregation is synthesized through a solvothermal synthesis technique using water ($H_2O$) and N,N-dimethylformamide (DMF) as solvents.

Specifically, $Co(CH_3COO)_2.4H_2O$, $Mn(CH_3COO)_2.4H_2O$, and $Fe(NO_3)_3.9H_2O$ of a total 0.01 mol are dissolved in 10 ml of deionized water while adjusting each molar ratio. A precursor aqueous solution is mixed with 140 ml of N,N-dimethylformamide (DMF) at 80° C. In order to form a solid solution of Co, Mn and Fe, the mixed solution is stirred at about 80° C. for about 1 hour and then cooled to room temperature. Then, controlled amounts of phosphoric acid ($H_3PO_4$), lithium hydroxide monohydrate ($LiOH.H_2O$), and ascorbic acid ($C_6H_8O_6$) are introduced into the solution so that the ratio of Li: transition metal (TM): $PO_4$ in the molar ratio precursor solution becomes about 3:1:1.3.

Because the form of $LiCo_xMn_yFe_zPO_4$ aggregation depends on the pH value during the solvothermal reaction, the pH is adjusted by injecting different amounts of nitric acid ($HNO_3$). At this time, in order to obtain spherical secondary particles, the pH is adjusted to about 6.5 or more, preferably about 6.5. But in order to obtain plate-like secondary particles, the pH is adjusted to about 5.5 to 6.5, preferably about 5.5.

The stirred mixed solution is transferred to an autoclave made of Teflon and heated at about 180° C. for about 12 hours. The resulting solution is centrifuged, washed with deionized water and acetone, and then dried at about 60° C. for more than one day.

The resulting $LiCo_xMn_yFe_zPO_4$ secondary particle powder is coated with carbon-based material. The $LiCo_xMn_yFe_zPO_4$ secondary particles and sucrose are mixed in water (or ethanol) at a ratio of $LiCo_xMn_yFe_zPO_4$: Sucrose=7:3, stirred thoroughly, dried at about 60° C., and calcined at about 700° C. for about 3 hours under an argon atmosphere. In this step, instead of sucrose, citric acid or ascorbic acid may be used. As a result, manganese-based olivine structural $LiCo_xMn_yFe_zPO_4$ small particles having average particle diameter of about 1 μm are obtained.

The obtained manganese-based olivine structural $LiCo_xMn_yFe_zPO_4$ small particles having average particle diameter of about 1 μm are sufficiently mixed with layered $LiCoO_2$ large particles having average particle size of about 20 μm, and thus a bimodal-type cathode active material is obtained.

In Example 1, the manganese-based olivine structural small particles according to one embodiment of the disclosure are represented by the formula $LiCo_{0.1}Mn_{0.8}Fe_{0.1}PO_4$, where the Mn content is relatively increased and Co and Fe contents are relatively decreased. In this case, as seen from the graph of FIG. 4A, the operating voltage is high (about 4.1 V). It is therefore possible to ensure high energy density, realize high power output capability, and ensure high voltage stability.

In Example 2, the manganese-based olivine structural small particles according to one embodiment of the disclosure are represented by the formula $LiCo_{0.4}Mn_{0.4}Fe_{0.2}PO_4$, where the Fe content is relatively decreased and the Co and Mn contents are equal to each other. In this case, as seen from the graph of FIG. 4B, the operating voltage is high (about 4.3 V). It is therefore possible to maximize energy density and ensure high voltage stability.

In Example 3, the manganese-based olivine structural small particles according to one embodiment of the disclosure are represented by the formula $LiCo_{0.2}Mn_{0.2}Fe_{0.6}PO_4$, where the Fe content is relatively increased and Co and Mn contents are relatively decreased. In this case, as seen from the graph of FIG. 4C, the operating voltage is lower than those in the above two cases, and it may be somewhat disadvantageous in terms of energy density as compared with Examples 1 and 2. However, because of higher Fe content, excellent power output capability can be realized, and high voltage stability can be ensured.

Figure 5:
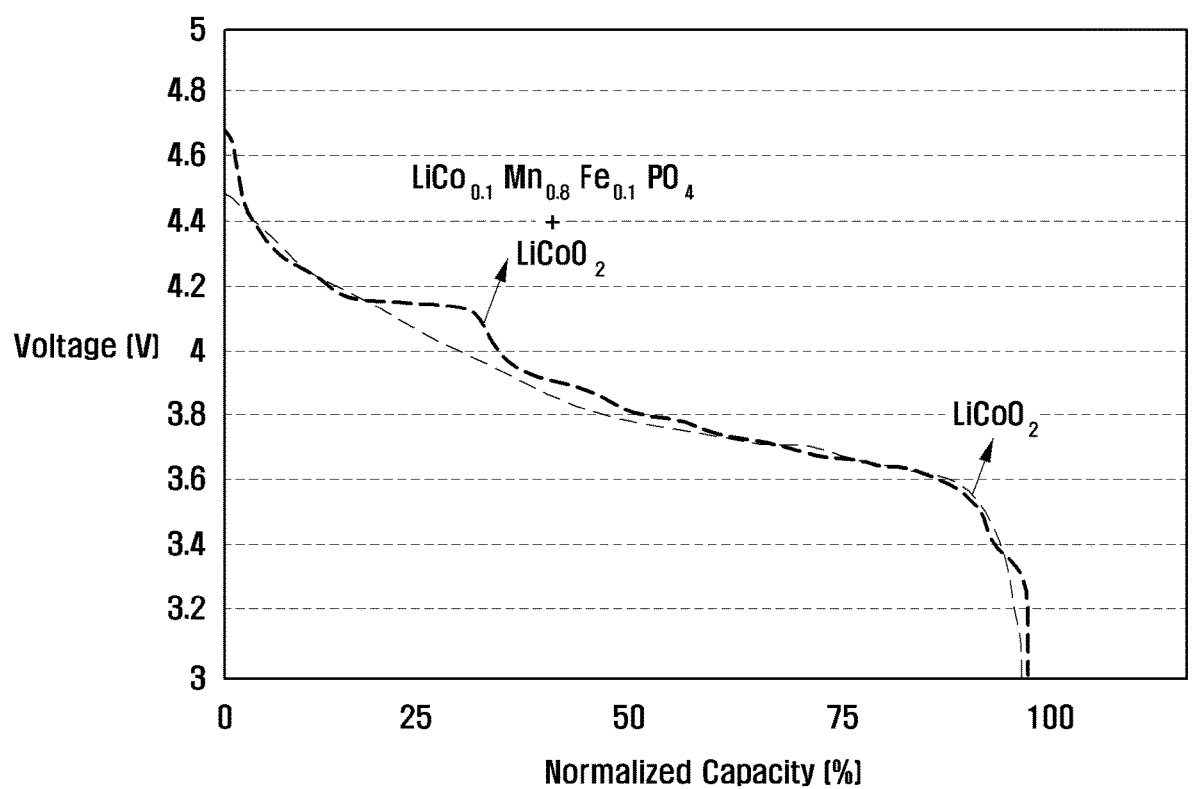
FIG. 5 is a graph showing a comparison between a discharge curve of layered $LiCoO_2$ and a discharge curve of a cathode active material according to one embodiment of the disclosure that is produced by mixing a layered $LiCoO_2$ cathode material and an olivine structural $LiCo_{0.1}Mn_{0.8}Fe_{0.1}PO_4$ cathode material at a mass ratio of 8:2.

In addition, as can be seen from FIG. 5, the cathode active material of Example 1 has an increased energy density when the mixed mass ratio of $LiCoO_2$ and $LiCo_{0.1}Mn_{0.8}Fe_{0.1}PO_4$ particles is set to about 80:20.

Further, the cathode active material of Example 1, in which the layered $LiCoO_2$ large particle having average particle diameter of about 20 μm and the manganese-based olivine structural $LiCo_xMn_yFe_zPO_4$ small particle having average particle diameter of about 1 μm are mixed in a bimodal form, has a rolling density of about 4.4 g/cc maximally. This shows a significant increase compared with a rolling density of 4.1 g/cc or less for cathode active material in which the layered $LiCoO_2$ particles having different average particle diameters are mixed in the bimodal form.

Thus, the bimodal-type cathode active material for the lithium ion battery according to one or more embodiments of the disclosure uses a mixture of the layered $LiCoO_2$ large particle having average particle diameter of about 16 to 25 μm and the manganese-based olivine structural $LiCo_xM_nyFe_zPO_4$ (0≤x≤1, 0<y≤1, 0≤z≤1, x+y+z=1) having average particle diameter of about 1 to 3 μm. Such bimodal-type cathode active material exhibits high operating voltage and high rolling density, thus achieving high energy density and high voltage stability.

Certain embodiments of the instant disclosure may provide a cathode active material obtained by mixing layered $LiCoO_2$ large particles surface-treated to be used at a high voltage and manganese-based olivine structural $LiCo_xM_nyFe_zPO_4$ small particles having excellent structure and surface stabilities and excellent electrochemical characteristics. A producing method thereof is also provided.

Certain embodiments of the instant disclosure may provide the use of the cathode active material in manufacturing lithium ion batteries.

Certain embodiments of this instant disclosure may provide a method for not only improving energy density of lithium ion batteries by realizing high mass density through the use of the cathode active material disclosed herein in the lithium ion batteries, but also ensuring high voltage stability of the lithium ion batteries by minimizing surface reactivity.

Certain embodiments of the instant disclosure may provide lithium ion batteries having improved energy density and high voltage stability by including the cathode active material disclosed herein.

As described above, the cathode active material disclosed in one or more embodiments herein uses layered $LiCoO_2$ large particles and manganese-based olivine structural $LiCo_xMn_yFe_zPO_4$ small particles together in a bimodal type. The particles may have different average particle diameters. The batteries manufactured according to the one or more embodiments disclosed herein have improved energy density at high operating voltage, high rolling density, have excellent stability even in overheating/overcharging situations, and also have improved lifetime characteristics.

While the disclosure has been particularly shown and described with reference to exemplary embodiments thereof, it will be understood by those skilled in the art that various changes in form and details may be made therein without departing from the scope of the subject matter as defined by the appended claims.

What is claimed is:

1. A bimodal-type cathode active material for a lithium ion battery, comprising:
a mixture of layered $LiCoO_2$ large particles and manganese-based olivine structural small particles,
wherein the manganese-based olivine structural small particles are represented by chemical formula $LiCo_xMn_yFe_zPO_4$ ($0.1 \leq x \leq 0.4$, $0.2 \leq y \leq 0.8$, $0.1 \leq z \leq 0.6$, and $x+y+z=1$),
wherein an average particle diameter of the large particles is 16 to 25 μm, and an average particle diameter of the small particles is 1 to 3 μm,
wherein the large particles are surface-coated with $Al_2O_3$,
wherein the manganese-based olivine structural small particles are secondary particles made from aggregation of primary particles having an average thickness of about 100 nm or less, and
wherein the secondary particles have a spherical or plate-like mesocrystal aggregate structure.

2. The cathode active material of claim 1, wherein in the chemical formula $LiCo_xMn_yFe_zPO_4$ of the manganese-based olivine structural small particles, $0.7 \leq y \leq 0.8$.

3. The cathode active material of claim 1, wherein the secondary particles are formed using a solvothermal synthesis technique.

4. The cathode active material of claim 1, wherein surfaces of the secondary particles are coated with a carbon-based material.

5. The cathode active material of claim 1, wherein a mixing ratio of the large particles to the small particles is 80:20 to 99:1 by weight.

6. The cathode active material of claim 1, wherein the cathode active material has an operating voltage ranging from 3.0 V to 4.5 V.

7. The cathode active material of claim 1, wherein the cathode active material has a rolling density of 3.8 to 4.4 g/cc.

8. A lithium ion battery comprising a bimodal-type cathode active material including a mixture of layered $LiCoO_2$ large particles and manganese-based olivine structural small particles,
wherein the manganese-based olivine structural small particles are represented by chemical formula $LiCo_xMn_yFe_zPO_4$ ($0.1 \leq x \leq 0.4$, $0.2 \leq y \leq 0.8$, $0.1 \leq z \leq 0.6$, and $x+y+z=1$),
wherein an average particle diameter of the large particles is 16 to 25 μm, and an average particle diameter of the small particles is 1 to 3 μm,
wherein the large particles are surface-coated with $Al_2O_3$,
wherein the manganese-based olivine structural small particles are secondary particles made from aggregation of primary particles having an average thickness of about 100 nm or less, and
wherein the secondary particles have a spherical or plate-like mesocrystal aggregate structure.

9. An electronic device comprising a lithium ion battery used as a battery module, comprising a bimodal-type cathode active material including a mixture of layered $LiCoO_2$ large particles and manganese-based olivine structural small particles,
wherein the manganese-based olivine structural small particles are represented by chemical formula $LiCo_xMn_yFe_zPO_4$ ($0.1 \leq x \leq 0.4$, $0.2 \leq y \leq 0.8$, $0.1 \leq z \leq 0.6$, and $x+y+z=1$),
wherein an average particle diameter of the large particles is 16 to 25 μm, and an average particle diameter of the small particles is 1 to 3 μm,
wherein the large particles are surface-coated with $Al_2O_3$,
wherein the manganese-based olivine structural small particles are secondary particles made from aggregation of primary particles having an average thickness of about 100 nm or less, and
wherein the secondary particles have a spherical or plate-like mesocrystal aggregate structure.

* * * * *